UNITED STATES PATENT OFFICE.

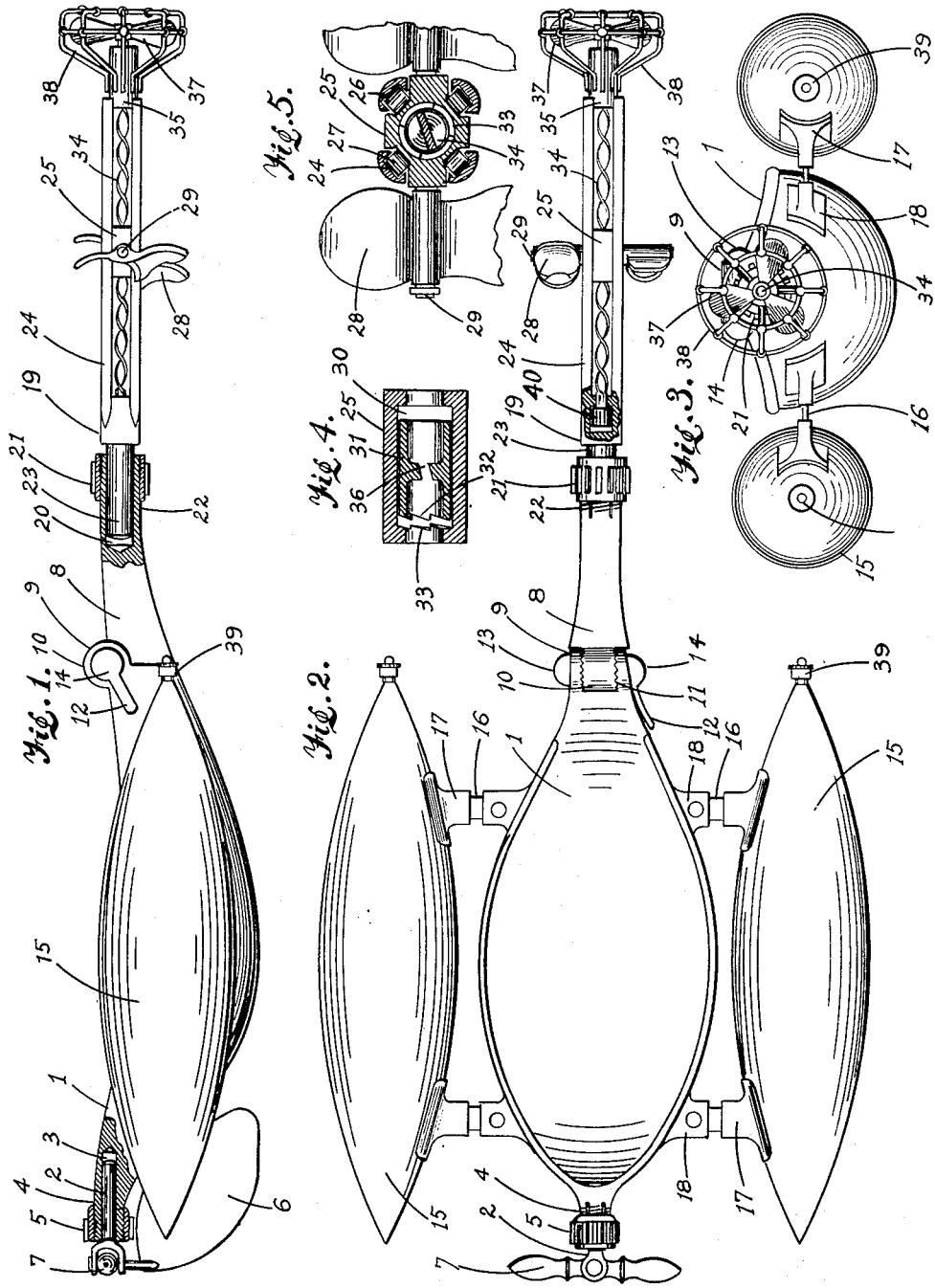

JAMES W. MASTER, OF SAN DIEGO, CALIFORNIA, ASSIGNOR OF ONE-HALF TO JAMES MASON, OF SAN DIEGO, CALIFORNIA.

LIFE-PRESERVER.

1,082,698. Specification of Letters Patent. Patented Dec. 30, 1913.

Application filed April 22, 1912, Serial No. 692,238. Renewed September 4, 1913. Serial No. 788,159.

*To all whom it may concern:*

Be it known that I, JAMES W. MASTER, a citizen of the United States, residing at San Diego, in the county of San Diego and State of California, have invented a new and useful Improvement in Life-Preservers, of which the following is a full and exact description.

This invention has relation to a device for the preservation of life and for sustainment upon the surface of and propulsion through water, the device being of especial utility in case of ship-wreck, and as a pleasure and amusement device, and consists of a new and improved type having the several features and advantages, and the combination and arrangement of parts herein specified, whereby the device will sustain its own and additional weight upon the water, and may be manually operated for locomotion thereon, being a modified form of my invention as disclosed in my application for Letters Patent filed February 20, 1912, bearing Serial Number 678,753.
It is a design of the invention to so relate the elements thereof, that the structure will be simple, compact, durable, and efficient in operation, the device comprising an elongated body member adapted to maintain buoyancy and so formed as to reduce friction in the water, a mechanism secured thereto for propulsion through the water, means for steering the device, means for locking the device in an open or a closed position, and pontoons attached thereto, and adapted to maintain the lateral stability of the device while in the water, a preferred embodiment of the device in which the principles of my invention are incorporated, being shown in the accompanying drawings, whereon—

Figure 1 is a side elevation of a device incorporating the principles of this invention, disclosing the position of the pontoons, the means for adjusting the device for length, the means for steering and the means for propulsion, Fig. 2 is a top plan view of the device as shown in Fig. 1, Fig. 3 is a rear elevation of the device, Fig. 4 is a sectional detail view of the driving nut which operates the propeller, and Fig. 5 is a sectional detail view of the reciprocating cross-head, the cross-head guides, and driving nut.

In the several figures of the drawing similar characters of reference apply to corresponding parts.

Assuming the invention to be embodied in the form illustrated, the upper part of buoyant member 1 is shaped to conform with the body of the user, and the lower part is shaped to reduce friction when propelled through the water, said buoyant member being preferably made of cork or similar buoyant material, and is provided at its forward end with an extension bar 2, which is adjustable in socket 3. To clamp bar 2 in position, the tapered end 4 is threaded and split, and is provided with a correspondingly threaded nut 5, which when adjusted, will tighten or clamp bar 2 in its socket, thereby adapted for adjusting the device to the user. Rudder 6 which is operated by handle 7, is operatively connected to bar 2, by a swivel joint.

Member 8 carries the propelling mechanism and is attached to member 1, by hinge 9, which has knuckles 10, provided on their adjacent faces with radially arranged projections 11, which hold said members in their adjusted position, the pintle being provided with a lever 12 whereby it may be turned, and having a flange 13 with a right-angled inner face bearing against the knuckle on one side, and flange 14 on the opposite end of the pintle, having a wedge-shaped face which bears against a corresponding face on the knuckle, whereby the device may be clamped or locked in the open position.

To increase the stability of the device, pontoons 15, are provided, one being placed on either side of member 1, the said pontoons being attached to member 1, by flexible straps 16, preferably made of leather. Strap members 16, are secured by and in rigid socket members 17, to the pontoons, the opposite ends of the strap members being attached to and detachable from rigid socket members 18, on member 1. The pontoons may therefore, be removed if desired.
Member 8 is provided with an extension 19, which is adjustable in socket 20, and is clamped in position by a threaded and tapered nut 21, which engages with the correspondingly threaded and split end 22, of member 8, nut 21 being provided with suitable knurls for manual operation. Shank 23 is suitably corrugated for retention in socket 20. Four rods 24 extend from member 19, and serve as guides for cross-head 25. Rods 24 are provided with a longitudinal channel 26 on their inner sides, and the cross-head is provided with rollers 27, which engage with said channels, thereby reducing friction when the cross-head is moved between said cross-head guides. Pedals 28 are designed to form a suitable bearing for the feet of the user, and are pivoted to bearing rods 29 which project on each side of the cross-head. The pedals are therefore adapted to oscillate in accordance with the position of the user's feet, permitting more power to be applied to operate the device. By the use of a large pedal the operator is enabled to work the device for a long period of time. The roller bearings provided for the cross-head increase the ease of the operation thereof.

Within the cross-head a recess 30 is provided, having therein operating nut 31. Ratchet teeth 32, on nut 31, engage with teeth 33, on the cross-head, thereby preventing the nut from rotating during one stroke of the reciprocating movement of the cross-head, the opposite end of the nut and cross-head being without ratchets, whereby the nut rotates freely during the opposite reciprocating movement of the cross-head. A flat bar 34, having a spiral twist, is journaled in member 19, and in bearing 35, and passes through cross-head 25 and operating nut 31, the said nut having an aperture 36, corresponding to the cross-sectional form of bar 34. The said bar 34 is rotated in one direction by the reciprocating movement of the cross-head, and, at the rear end, carries propeller 37, protected by a guard 38. An efficient mechanism is therefore provided, whereby the operator, by a kicking movement, may propel the device rapidly through the water.

The metal parts of my device are preferably made of aluminum, except spiral bar 34, and similar parts that are subject to friction, but any material may be used in the construction thereof. The buoyant member, may be made, preferably of cork waterproofed. The pontoons are preferably made of a suitable elastic and flexible material and are hollow, an air-valve 39 being provided for each pontoon, whereby the same may be inflated and act as a means for suspension. Bar 34, has a flanged head 40, engaging with a corresponding recess in member 19, which holds the bar against a longitudinal movement.

The pontoons materially assist in maintaining the stability of the device in heavy seas, and also increase the buoyancy thereof. The method of attaching the pontoons preserves their longitudinal alinement with the main body of the device.

From the foregoing it will be seen that the device may be used as a means of locomotion upon the water, the same may be folded for convenience and portability out of the water, and may be quickly clamped in an extended position and used as a life preserver, means for manual operation being provided whereby sufficient power may be developed to attain a speed of from twelve to fifteen miles per hour in swimming, enabling the operator to propel the device through and against heavy seas and swim to safety, and efficient means are provided for maintaining lateral equilibrium and prevent the overturning of the operator while using the device.

While simple and efficient means are herein provided for accomplishing the objects of the invention and the elements shown and described are well adapted to serve the purposes for which they are intended, it is to be understood that no limitation is made to the precise structural details exhibited, but that variations, alterations, and modifications, which may fall within the scope of the appended claims, may be made if desired, the essence of my invention comprising a neatly arranged device for controlling the direction of swimming, for insuring safety in the water, and for obtaining ease of propulsion through the water.

It may be seen that the pontoons, which are detachable, may be reversed, thereby placing the air valves at the forward end. When the air valves are in this position, the pontoons may be inflated at the will of the operator while the device is in use. The operator is thereby enabled to inflate the pontoons by removing the valve caps and blowing therein, no additional appliances being required therefor.

I claim as my invention:

1. In a life preserver, a buoyant member having a socket in the forward end thereof, a propeller carrying member foldable thereon, a clamping hinge to connect and hold said members in the extended position, and an adjustable steering device adapted to be extended relative to the propelling member, comprising an extension bar in said socket, a tapered, threaded, and split end on said buoyant member in which the socket is formed, a knurled nut on said threaded end to clamp said split end on said extension bar, a rudder connected to said bar by a swivel joint, and handles for the manual operation of said rudder, substantially as set forth.

2. In a life preserver, a buoyant member having a steering rudder attached thereto and means for operating the same, a propeller carrying member foldable on said buoyant member, a clamping hinge connecting said members in the extended position, and means for propulsion on said propeller carrying member, comprising guide rods extending therefrom and having longitudinal channels cut on their inner sides, a cross-head slidably mounted between said guide-rods, rollers carried by said cross-head and engaging with said longitudinal channels in said guide-rods, a flat bar having a spiral twist journaled in said carrying member, an operating nut in said cross-head, a bearing member at the end of said guide-rods, the said spiral bar passing through said nut and cross-head and being journaled in said carrying member, means for causing said nut to drive said spiral bar during the reciprocating movement of the cross-head comprising a ratchet end on the nut and a corresponding ratchet on the cross-head, a propeller on the rear end of said spiral bar, and a pair of oscillating pedals secured to said cross-head whereby the same may be operated by a kicking movement to effect the propulsion of the device through the water, substantially as set forth.

3. In a life preserver, a buoyant member acting for suspension, a member foldable thereon, a socket in said foldable member, a tapered and threaded end in which the socket is formed, a knurled and correspondingly threaded nut on said threaded end, and means for propulsion adapted to be clamped to said foldable member, comprising a shank member adapted to be clamped in said socket by turning said knurled nut, guide-rods extending at the rear of said shank member, a cross-head operated upon said guide-rods, said cross-head having a reciprocating movement, a spiral bar rotatably mounted between said guide-rods, an enlarged end on said spiral bar mounted in a recessed bearing in said shank member to prevent longitudinal movement, a propeller mounted on the rear end of said spiral bar, an operating nut in said cross-head engaging with said spiral bar, ratchets on one end of the nut and the corresponding end of the cross-head, which cause the nut to drive the spiral bar during one part of the reciprocating movement of the cross-head, a smooth face on the opposite end of the nut allowing the nut to rotate with the spiral bar, and oscillating pedals carried by the cross-head whereby the same may be operated by a kicking movement to actuate said propeller, said pedals having a suitable surface to engage with the foot of the operator, substantially as set forth.

In testimony whereof I hereunto affix my signature this 9th day of April, 1912.

JAMES W. MASTER.

In the presence of—
F. M. KEENEY,
NILS S. ABRAHAMSON.